United States Patent
Park et al.

(10) Patent No.: US 8,571,605 B2
(45) Date of Patent: Oct. 29, 2013

(54) MOBILE TERMINAL AND METHOD OF REDUCING POWER CONSUMPTION FOR A DUAL DISPLAY SYSTEM

(75) Inventors: Jun Serk Park, Seoul (KR); Na Ri Lee, Seoul (KR); Kang Min Kim, Seoul (KR); Kyoung Joung Kim, Seoul (KR); Jung Eun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 12/507,644

(22) Filed: Jul. 22, 2009

(65) Prior Publication Data

US 2010/0048253 A1 Feb. 25, 2010

(30) Foreign Application Priority Data

Aug. 22, 2008 (KR) ........................ 10-2008-0082465

(51) Int. Cl.
*H04M 1/00* (2006.01)
(52) U.S. Cl.
USPC ............ 455/566; 455/574; 455/416; 345/1.1; 345/211
(58) Field of Classification Search
None
See application file for complete search history.

(56) References Cited

U.S. PATENT DOCUMENTS

| | | | | |
|---|---|---|---|---|
| 2004/0067769 A1* | 4/2004 | King et al. | ........... | 455/556.1 |
| 2005/0140574 A1* | 6/2005 | Tamura | ........... | 345/9 |
| 2005/0143137 A1* | 6/2005 | Matsunaga et al. | ........... | 455/566 |
| 2006/0194619 A1 | 8/2006 | Wilcox et al. | | |
| 2007/0273609 A1* | 11/2007 | Yamaguchi et al. | ........... | 345/1.1 |
| 2008/0096611 A1* | 4/2008 | Lee | ........... | 455/566 |
| 2010/0277454 A1* | 11/2010 | Gettemy et al. | ........... | 345/211 |

FOREIGN PATENT DOCUMENTS

| | | |
|---|---|---|
| CN | 1622672 | 6/2005 |
| CN | 1871576 | 11/2006 |
| CN | 200947621 | 9/2007 |
| CN | 101287037 | 10/2008 |
| EP | 1274062 | 1/2003 |
| WO | 03090056 | 10/2003 |
| WO | 2005029305 | 3/2005 |
| WO | 2005106625 | 11/2005 |
| WO | 2007071919 | 6/2007 |
| WO | 2007122439 | 11/2007 |

OTHER PUBLICATIONS

The State Intellectual Property Office of the People's Republic of China Application Serial No. 200910163558.0, Office Action dated Nov. 29, 2012, 16 pages.

\* cited by examiner

*Primary Examiner* — Rafael Pérez-Gutiérrez
*Assistant Examiner* — Keith Fang
(74) *Attorney, Agent, or Firm* — Lee, Hong, Degerman, Kang & Waimey

(57) ABSTRACT

A mobile terminal and method of reducing power consumption in the mobile terminal are provided. The method includes displaying an operation screen in the first display module, determining a remaining battery power of the mobile terminal, and disabling the first display module and displaying the operation screen in the second display module in response to determining that the remaining battery power is less than a reference battery power.

17 Claims, 13 Drawing Sheets

MOBILE TERMINAL AND METHOD OF REDUCING POWER CONSUMPTION FOR A DUAL DISPLAY SYSTEM

CROSS-REFERENCE TO RELATED APPLICATIONS

Pursuant to 35 U.S.C. §119(a), this application claims the benefit of earlier filing date and right of priority to Korean Patent Application No. 10-2008-0082465, filed on Aug. 22, 2008, the contents of which are incorporated by reference herein in their entirety.

FIELD OF THE INVENTION

The present invention relates to a mobile terminal and a method of controlling the mobile terminal, and more particularly, to a mobile terminal configured to reduce power consumption.

DESCRIPTION OF THE RELATED ART

Mobile terminals are portable devices, which can provide users with various services such as a voice calling service, a video calling service, an information input/output service, and a data storage service.

As the types of services provided by mobile terminals are increasingly diversified, mobile terminals are evolving into multimedia players. For example, mobile terminals are being equipped with various functions such as capturing photos or moving pictures, playing music files or moving image files, executing game programs, receiving broadcast programs and providing wireless Internet services. Such functions have been implemented in mobile terminals in hardware or software.

In addition, mobile terminals generally receive their operating power from a limited power source, such as a battery. As such, mobile terminals are required to provide high power efficiency.

The increase in the types of services provided by mobile terminals has created a demand for mobile terminals incorporating multiple display modules or screens. However, such mobile terminals incorporating multiple display modules can consume a substantial amount of power which can rapidly deplete the power source of the mobile terminal.

SUMMARY OF THE INVENTION

In one aspect of the present invention, a method of reducing power consumption in a mobile terminal having a first display module and a second display module is provided. The method includes displaying an operation screen in the first display module, determining a remaining battery power of the mobile terminal, and disabling the first display module and displaying the operation screen in the second display module in response to determining that the remaining battery power is less than a reference battery power.

It is contemplated that the first and second display modules each include a touch screen and e-paper. It is further contemplated that the mobile terminal comprises a main body having a front surface and a rear surface and wherein the first display module is located on the front surface and the second display module is located on the rear surface.

It is contemplated that the operation screen is a Web page. It is further contemplated that the displaying the operation screen in the second display module includes displaying a text of the Web page in the second display module without displaying an image included in the Web page. It is still further contemplated that the displaying the operation screen in the second display module includes displaying a selected portion of the Web page in the second display module.

It is contemplated that the method further includes performing a search operation and displaying a result of the search operation in a search result screen in the second display module. It is further contemplated that the method further includes setting the reference battery power according to a user input.

It is contemplated that the method further includes displaying a message in the second display module when the remaining battery power is less than the reference battery power after the disabling the first display module, wherein the message is an indication that the remaining battery power is insufficient. It is contemplated that the method further includes entering a power-save mode of the mobile terminal after the disabling of the first display module.

In one aspect of the invention, a mobile terminal is provided. The mobile terminal includes a main body, a first display module located on a first surface of the main body and a second display module located on a second surface of the main body, and a controller configured to display an operation screen in the first display module and determine a remaining battery power of the mobile terminal, wherein the controller disables the first display module and displays the operation screen in the second display module when the remaining battery power is less than a reference battery power.

It is contemplated that the first and second display modules each include a touch screen and e-paper. It is further contemplated that the operation screen is a Web page.

It is contemplated that the controller is further configured to perform a search operation and display a result of the search operation in a search result screen in the second display module. It is further contemplated that the first surface is a front surface of the main body and the second surface is a rear surface of the main body.

It is contemplated that the controller causes the mobile terminal to enter a power-save mode after the first display module is disabled.

In one aspect of the invention, a method of reducing power consumption in a mobile terminal including a main body, a first display module located on a first surface of the main body and a second display module located on a second surface of the main body is provided. The method includes displaying an operation screen in the first display module, determining the remaining battery power of the mobile terminal, disabling the first display module and entering a power-save mode when the remaining battery power is less than a reference battery power, and displaying one or more menu items that can be executed in the power-save mode in the second display module.

It is contemplated that the first and second display modules each include a touch screen and e-paper.

It is contemplated that the method further includes performing an operation corresponding to the one or more menu items in response to an input received at the mobile terminal. It is further contemplated that the method further includes displaying information indicating the period of time that the operation can be performed with the remaining battery power.

In one aspect of the invention, a mobile terminal is provided. The mobile terminal comprising a main body, a first display module located on a first surface of the main body and a second display module located on a second surface of the main body, and a controller configured to display an operation screen in the first display module and determine a remaining battery power of the mobile terminal, wherein the controller causes the mobile terminal to enter a power-save mode and display in the second display module one or more menu items that can be executed in the power-save mode when the remaining battery power is less than a reference battery power.

It is contemplated that the first and second display modules each include a touch screen and e-paper. It is further contemplated that the controller controls an operation corresponding to the one or more menu items in response to an input.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention will hereinafter be described in detail with reference to the accompanying drawings in which exemplary embodiments of the invention are shown.

The term "mobile terminal," as used herein, may indicate a mobile phone, a smart phone, a laptop book computer, a digital broadcast receiver, a personal digital assistant (PDA), a portable multimedia player (PMP), or a navigation device.

Figure 1:
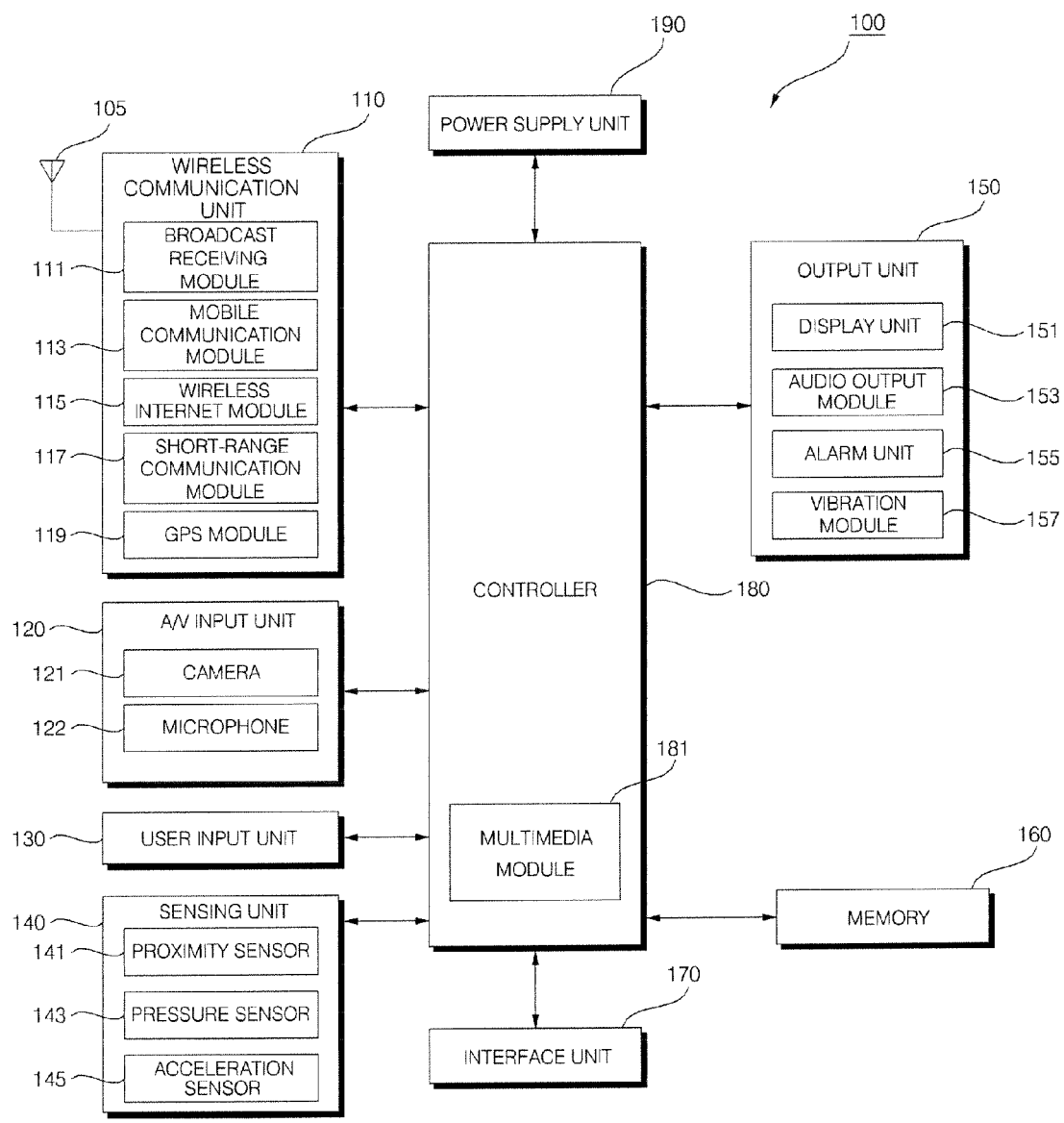
FIG. 1 illustrates a block diagram of a mobile terminal in accordance with one embodiment of the invention.

FIG. 1 illustrates a block diagram of a mobile terminal 100 in accordance with one embodiment of the present invention. As shown in FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1 without departing from the spirit and scope of the invention.

The wireless communication unit 110 includes a broadcast receiving module 111, a mobile communication module 113, a wireless Internet module 115, a short-range communication module 117, and a global positioning system (GPS) module 119.

The broadcast receiving module 111 can be configured to receive a broadcast signal and/or broadcast-related information from an external broadcast management server via a broadcast channel. For example, the broadcast channel can be a satellite channel or a terrestrial channel. The broadcast management server can be a server configured to generate broadcast signals and/or broadcast-related information and transmit the generated broadcast signals and/or the generated broadcast-related information, or a server which receives and then transmits previously-generated broadcast signals and/or previously-generated broadcast-related information.

The broadcast-related information can be, for example, broadcast channel information, broadcast program information or broadcast service provider information. The broadcast signal can be, for example, a TV broadcast signal, a radio broadcast signal, a data broadcast signal, or the combination of a data broadcast signal and either a TV broadcast signal or a radio broadcast signal. The broadcast-related information can be provided to the mobile terminal 100 via a mobile communication network. In this case, the broadcast-related information can be received by the mobile communication module 113, rather than the broadcast reception module 111. The broadcast-related information can take various forms, such as an electronic program guide (EPG) of digital multimedia broadcasting (DMB) or an electronic service guide (ESG) of digital video broadcast-handheld (DVB-H).

The broadcast receiving module 111 can be configured to receive the broadcast signals broadcast by various types of broadcasting systems such as digital multimedia broadcasting-terrestrial (DMB-T), digital multimedia broadcasting-satellite (DMB-S), the data broadcasting system known as media forward link only (MediaFLO), digital video broadcast-handheld (DVB-H), or integrated services digital broadcast-terrestrial (ISDB-T). In addition, the broadcast receiving module 111 can be configured to be suitable for nearly all types of broadcasting systems other than those set forth herein.

The broadcast signal and/or the broadcast-related information received via the broadcast receiving module 111 can be stored in a storage medium, such as the memory 160.

The mobile communication module 113 transmits and/or receives wireless signals to and/or from at least one of a base station, an external terminal, or a server via a mobile communication network. The wireless signals can include various types of data according to whether the mobile terminal 100 transmits or receives voice call signals, video call signals, or text/multimedia messages.

The wireless Internet module 115 can be configured to wirelessly access the Internet. The wireless Internet module 115 can be embedded in the mobile terminal 100 or can be installed in an external device. The wireless Internet module 115 can use various wireless Internet techniques, such as wireless fidelity (WiFi), Wireless Broadband (Wibro), World Interoperability for Microwave Access (WiMAX) or High-Speed Downlink Packet Access (HSDPA).

The short-range communication module 117 can support short-range or local area communication. The short-range communication module 117 can use various short-range communication techniques, such as Bluetooth™, radio-frequency identification (RFID), Infrared Data Association (IrDA), Ultra-wideband (UWB), or ZigBee™.

The GPS module 119 can receive position information from a plurality of GPS satellites.

As shown in FIG. 1, the A/V input unit 120 can be used to receive audio signals or video signals. The A/V input unit 120 can include a camera 121 and a microphone module 123. For example, the camera 121 can process various image frames, such as still images or moving images captured by an image sensor during a video call mode or an image capturing mode. The image frames processed by the camera 121 can be displayed by a display module, such as display module 151.

The image frames processed by the camera 121 can be stored in the memory 160 or other storage medium, or transmitted outside the mobile terminal 100 via the wireless communication unit 110. Other embodiments of the mobile terminal 100 can include more than camera 121.

The microphone module 122 can receive external sound signals in a phone call mode, a recording mode, or a voice recognition mode via a microphone and can process such sound signals into audio data. For example, when the mobile terminal 100 is in the phone call mode, the mobile communication module 113 can convert the audio data into data that can be transmitted to a mobile communication base station and output the data. The microphone module 122 can include various types of noise removal algorithms to remove or suppress any undesirable noise that may be generated during the reception of external sound signals.

The user input unit 130 can be a user input device configured to generate key input data based on user inputs for controlling the various operations of the mobile terminal 100. The user input unit 130 may be implemented as a keypad, a dome switch, a static pressure or constant electricity touch pad, a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 can detect a current state of the mobile terminal 100, such as whether the mobile terminal 100 is in an opened or closed state, the position or orientation of the mobile terminal 100, and the absence or presence of user contact with the mobile terminal 100. The sensing unit 140 can be configured to generate a sensing signal for controlling the operation of the mobile terminal 100. For example, when the mobile terminal 100 is a slider-type mobile phone, the sensing unit 140 can detect whether the mobile terminal 100 is opened or closed. Furthermore, the sensing unit 140 can be configured to detect whether the mobile terminal 100 is powered by the power supply unit 190 and whether the interface unit 170 is connected to an external device. In one embodiment, the sensing unit 140 can include a proximity sensor 141, a pressure sensor 143, and an acceleration sensor 145.

The proximity sensor 141 can be configured to detect objects in proximity to or approaching the mobile terminal 100, without any physical contact with the object. More specifically, the proximity sensor 141 can detect an object in proximity to or approaching the mobile terminal 100 by detecting a change in an alternating magnetic field or the rate of change of static capacitance. In other embodiments, the sensing unit 140 can include two or more proximity sensors 141.

The pressure sensor 143 can be configured to detect whether pressure is being applied to the mobile terminal 100 and can detect the magnitude of pressure applied to the mobile terminal 100. The pressure sensor 143 can be installed in a portion of the mobile terminal 100 where the detection of pressure is desirable or necessary.

For example, the pressure sensor 143 can be installed in the display unit 151. In such a case, the display unit 151 can differentiate a typical touch input from a pressure touch input, which is generated by applying greater pressure than the pressure used to generate a typical touch input based on a signal output by the pressure sensor 143. In addition, the magnitude of pressure applied to the display module 151 can be determined upon receiving a pressure touch input based on the signal output by the pressure sensor 143.

An acceleration sensor is a device for detecting variations in acceleration and converting the variation into an electrical signal. With recent developments in micro-electromechanical system (MEMS) technology, acceleration sensors have been widely used in various products for various purposes. For example, an acceleration sensor can be installed in an airbag system in an automobile to detect a collision. Alternatively, an acceleration sensor can be used as an input device in a computer game controller and configured to sense the motion of the human hand during play of a computer game. In one embodiment, several acceleration sensors, such as acceleration sensor 145, can be installed in the mobile terminal 100 to represent various axial directions. Alternatively, only one acceleration sensor 145 representing a Z axis may be installed in the mobile terminal 100.

The output unit 150 can be configured to output audio signals, video signals and alarm signals. In one embodiment, the output unit 150 can include the display unit 151, an audio output module 153, an alarm module 155, and a haptic module 157.

The display unit 151 can display information processed by the mobile terminal 100. For example, when the mobile terminal 100 is in a phone call mode, the display unit 151 can display a user interface (UI) or a graphic user interface (GUI) associated with a telephone call or other communication. For example, the display unit 151 can be configured to display a UI or a GUI for capturing or receiving images when the mobile terminal 100 is in a video call mode or an image capturing mode.

When the display unit 151 and the user input unit 130 form a mutual layer structure and are thus implemented as a touch screen, the display unit 151 can be used as an output device, as well as an input device. When the display unit 151 is implemented as a touch screen, the display unit 151 can also include a touch screen panel and a touch screen panel controller.

The touch screen panel, for example, can be a transparent panel attached to the exterior of the mobile terminal 100 and can be connected to an internal bus of the mobile terminal 100. The touch screen panel can detect whether the touch screen panel is being contacted by a user. Once a touch input to the touch screen panel is detected, the touch screen panel can transmit signals corresponding to the touch input to the touch screen panel controller. The touch screen panel controller can process the signals transmitted by the touch screen panel, and can transmit the processed signals to the control unit 180. The control unit 180 can determine whether a touch input has been generated and which part of the touch screen panel has been touched based on the processed signals transmitted by the touch screen panel controller.

In one embodiment, the display unit 151 can include electronic paper (e-paper). E-paper is a type of reflective display technology that can achieve a high resolution, wide viewing angles and can maintain a displayed image even after power is no longer supplied. E-paper can be implemented on any type of substrate, such as plastic, metallic or paper. In addition, e-paper can reduce the power consumption of the mobile terminal 100, because it does not require a backlight assembly. The display unit 151 may be implemented as e-paper by using electrostatic-charged hemispherical twist balls, electrophoretic deposition, or microcapsules.

As described above, when the display unit 151 and the user input unit 130 form a mutual layer structure, the display unit 151 can be used as an output device, as well as an input device. The display unit 151 can include at least a liquid crystal display (LCD), a thin film transistor (TFT)-LCD, an organic light-emitting diode (OLED), a flexible display, or a three-dimensional (3D) display. In one embodiment, the mobile terminal 100 can include two or more display modules 151. For example, the mobile terminal 100 can include an external display module (not shown) and an internal display module (not shown).

The audio output module 153 can output audio data received by the wireless communication unit 110 during a call reception mode, a call mode, a recording mode, a voice recognition mode, or a broadcast reception mode or can output audio data stored in the memory 160. In addition, the audio output module 153 can output various sound signals associated with the functions of the mobile terminal 100, such as receiving a call or a message. The audio output module 153 can include, for example, a speaker and a buzzer.

The alarm unit 155 can output an alarm signal indicating the occurrence of an event in the mobile terminal 100, such as receiving a call signal, receiving a message, or receiving a key signal. The alarm signal can be, for example, an audio signal, a video signal, and/or a vibration signal. For example, the alarm unit 155 can output an alarm signal upon receiving a call signal or a message. In addition, the alarm unit 155 can receive a key signal and output an alarm signal as feedback to the key signal. Once an alarm signal is output by the alarm unit 155, the user can be notified that an event has occurred. An alarm signal for notifying the user of the occurrence of an event can also be output by the display unit 151 or the audio output module 153.

The vibration module 157, also herein referred to as the haptic module 157, can provide various haptic effects (such as vibrations) that can be detected by the user. When the haptic module 157 generates vibrations, the intensity and the pattern of vibrations can be altered. The haptic module 157 can synthesize different vibration effects and can output the result. Alternatively, the haptic module 157 can sequentially output different vibration effects.

The haptic module 157 may provide various haptic effects other than vibrations, such as a stimulation caused by an arrangement of vertically moving pins that are in contact with the skin of the user, a stimulation caused by a discharge or suction of air through a discharge hole or a suction hole, a stimulation involving an application of a stimulus to the surface of the user's skin, a stimulation caused by contact with an electrode, a stimulation caused by an electrostatic force, and a stimulation caused by the application of cold and warm temperatures using an element capable of absorbing or radiating heat.

The haptic module 157 can be enable a user to feel haptic effects via kinesthetic sense of her fingers or arms. For example, the mobile terminal 100 can include at least two haptic modules 157.

The memory 160 may store various programs that are used for the processing and operations performed by the controller 180. In addition, the memory 160 can store various data such as a phonebook, messages, still images, or moving images.

For example, the memory 160 may include at least one type of storage medium, such as a flash memory, a hard disk, a multimedia card, a micro type memory, a card type memory, such as a secure digital (SD) card or extreme digital (XD) card, a random access memory (RAM), or a read-only memory (ROM). In other embodiments, the memory 160 can be a network storage device that can be accessed by the mobile terminal 100 via a network, such as the Internet.

The interface unit 170 can interface with an external device that can be connected to the mobile terminal 100. For example, the interface unit 170 can be a wired/wireless headset, an external battery charger, a wired/wireless data port, a card socket for a memory card, a subscriber identification module (SIM)/user identity module (UIM) card, an audio input/output (I/O) terminal, a video I/O terminal, or an earphone. The interface unit 170 can receive data from an external device or can be used to receive power from an external device. The interface unit 170 can transmit data provided by an external device to other components in the mobile terminal 100 or can transmit data provided by other components in the mobile terminal 100 to an external device.

When the mobile terminal 100 is connected to an external cradle (not shown in FIG. 1), power can be supplied from the external cradle to the mobile terminal 100 through the interface unit 170. In addition, various command signals can be transmitted from the external cradle to the mobile terminal 100 through the interface unit 170.

The controller 180 can control the general operations of the mobile terminal 100. For example, the controller 180 can perform various control operations related to making and receiving a voice call, transmitting and receiving data, or making and receiving a video call.

The controller 180 can include a multimedia module 181 for reproducing or playing back multimedia data. In one embodiment, the multimedia module 181 can be implemented as a hardware device and can be installed in the controller 180. In another embodiment, the multimedia module 181 may be implemented as a software program.

The power supply unit 190 can be an external power source or an internal power source and supplies power to other components in the mobile terminal 100. In one embodiment, the power supply unit 190 can include a battery. The power supply unit 190 can measure various parameters of the battery related to charging, discharging, self-charging and temperature. The power supply unit 190 can include a voltage-to-frequency converter (VFC) for incorporating consecutive charging and discharging to enable high precision measurements in various battery-operating conditions. In one embodiment, the battery can be a rechargeable battery.

The mobile terminal 100 can include a wired/wireless communication system and a satellite-based communication system. The mobile terminal 100 can be configured to operate in a communication system transmitting data as frames or packets.

In one embodiment, the mobile terminal 100 can be a slider-type mobile phone. However, in other embodiments, the present invention can be applied to various other types of mobile phones.

Figure 2:
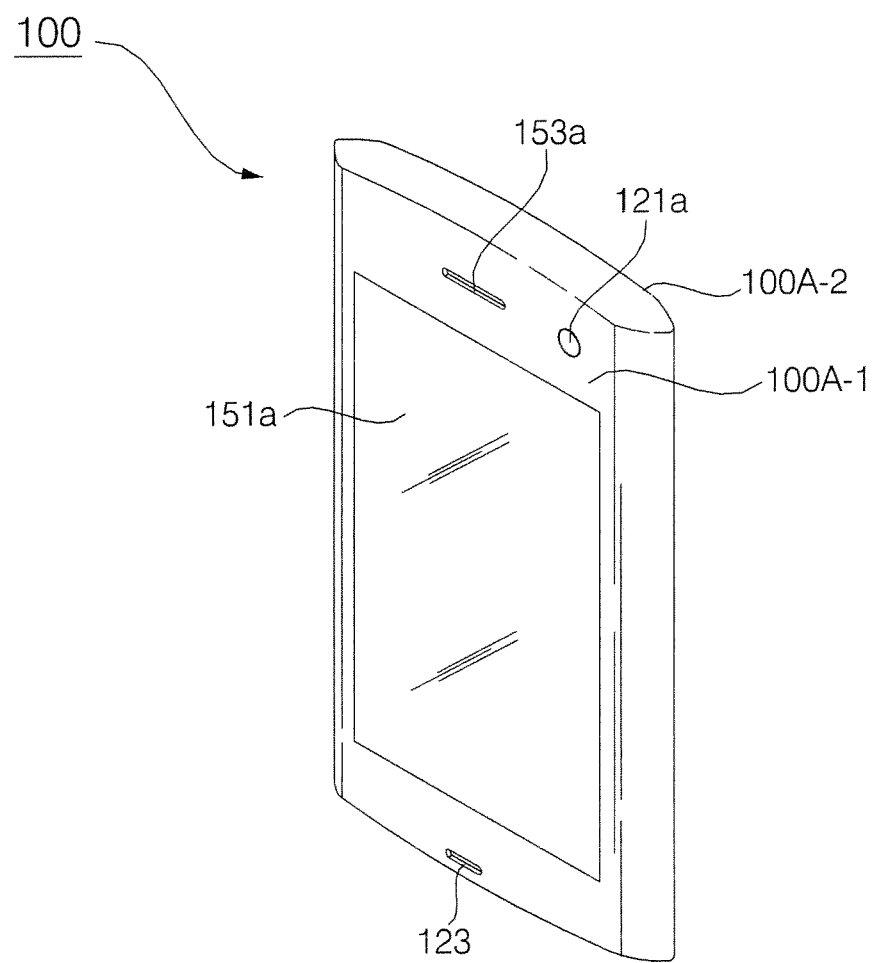
FIG. 2 illustrates a front perspective view of the mobile terminal in accordance with one embodiment of the invention.

FIG. 2 illustrates a front perspective view of the mobile terminal 100 in accordance with one embodiment of the invention.

As shown in FIG. 2, the exterior of the mobile terminal 100 includes a front case 100A-1 and a rear case 100A-2. Various electronic components can be installed in the space (not shown in FIG. 2) between the front case 100A-1 and the rear case 100A-2. At least one intermediate case can be additionally disposed between the front case 100A-1 and the rear case 100A-2.

For example, the front case 100A-1 and the rear case 100A-2 can be formed by injection molding of a synthetic resin. Alternatively, the front case 100A-1 and the rear case 100A-2 can be formed of a metal, such as stainless steel (STS) or titanium (Ti).

As shown in FIG. 2, a first display module 151a, a first sound module 153a, a first camera 121a, and a user input unit 130 (not shown in FIG. 3) are disposed on the front case 100A-1. The first display module 151a can be, for example, an LCD, OLED, or e-paper.

In one embodiment, the first display module 151a can be configured as a touch screen by incorporating the user input unit 130. Thus, a user can use the first display module 151a to input information by touching the first display module 151a.

The first sound module 153a can be implemented as a receiver or a speaker. The first camera 121a can be configured to capture a still image or a moving image. The microphone 123 can be configured to receive the voice of a user or other sounds.

The user input unit 130 can be configured to use various manipulation methods which offer tactile feedback to a user. For example, the user input unit 130 may be implemented as a dome switch or a touch pad which receives a command or information upon being pushed or touched by a user. As another example, the user input unit 130 may be implemented as a wheel, a jog dial, or a joystick.

The user input unit 130 can allow a user to input such commands as "start," "end," and "scroll." The user input unit 130 can also allow a user to choose an operating mode and can serve as a hot key for activating certain functions of the mobile terminal 100.

Figure 3:
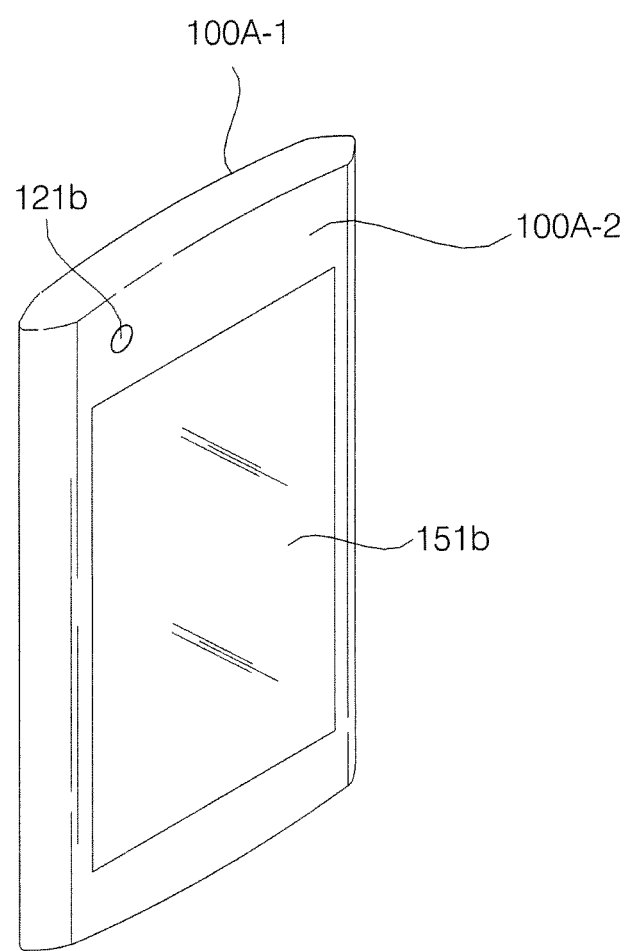
FIG. 3 illustrates a rear perspective view of the mobile terminal in accordance with one embodiment of the invention.

FIG. 3 illustrates a rear perspective view of the mobile terminal 100 in accordance with one embodiment of the invention. In one embodiment, an interface unit (not shown) can be disposed in the rear case 100A-2.

As shown in FIG. 3, a second camera 121b can be disposed at the rear of the rear case 100A-2. The second camera 121b can have a direction of view that is substantially opposite to the direction of the first camera 121a shown in FIG. 2. In one embodiment, the first camera 121a can be rotatably coupled to the front case 100A-1 and can achieve the direction of view of the second camera 121b. In such an embodiment, the second camera 121b can be optional.

In one embodiment, the first camera 121a can be configured to operate with a relatively lower resolution than the second camera 121b. For example, the first camera 121a can be used to capture an image of the user to allow immediate transmission of the image during a video call and the second camera 121b can be used to capture images of general objects with high picture quality, which may not require immediate transmission in real-time, but may be stored for later viewing or use.

Additional camera related components, such as flash (not shown in FIG. 3) and a mirror (not shown FIG. 3) can be disposed near the second camera 121b. The mirror allows self-image capturing by allowing the user to see himself when the user desires to capture his own image using the camera 121b. The camera flash may illuminate a subject when the second camera 121b captures an image of the subject.

A second audio output module (not shown in FIG. 3) can be additionally provided in the rear case 100A-2. The second audio output module can support a stereophonic sound function along with the first audio output module 153a. The second audio output module can also be used during a speakerphone mode.

An antenna (not shown) for receiving a broadcast signal can be disposed on one side of the rear case 100A-2. The antenna can be extended and retracted from the rear case 100A-2.

The interface unit 170 can serve as a path for enabling the mobile terminal 100 to exchange data with an external device. For example, the interface unit 170 can be a connection terminal for connecting an earphone to the mobile terminal 100 using a wired or wireless connection, a port for short-range communication or a power supply terminal for supplying operating power to the mobile terminal 100. The interface unit 170 can be a SIM or a UIM, or a card socket for an exterior-type card, such as a memory card for storing data.

The power supply unit can be disposed in the rear case 100A-2. The power supply unit 190 can be detachably coupled to the rear case 100A-2.

In one embodiment, the mobile terminal 100, via the controller 180, can selectively utilize the first display module 151a, which can be configured to display a color image, and the second display module 151b, which can be configured to display a black-and-white image. The second display module 151b can be configured to maintain a displayed image and can consume less power than the first display module 151a based on the operating environment of the mobile terminal 100. The mobile terminal 100 can perform the functions of a double-sided display using the first display module 151a and the second display module 151b.

Figure 4:
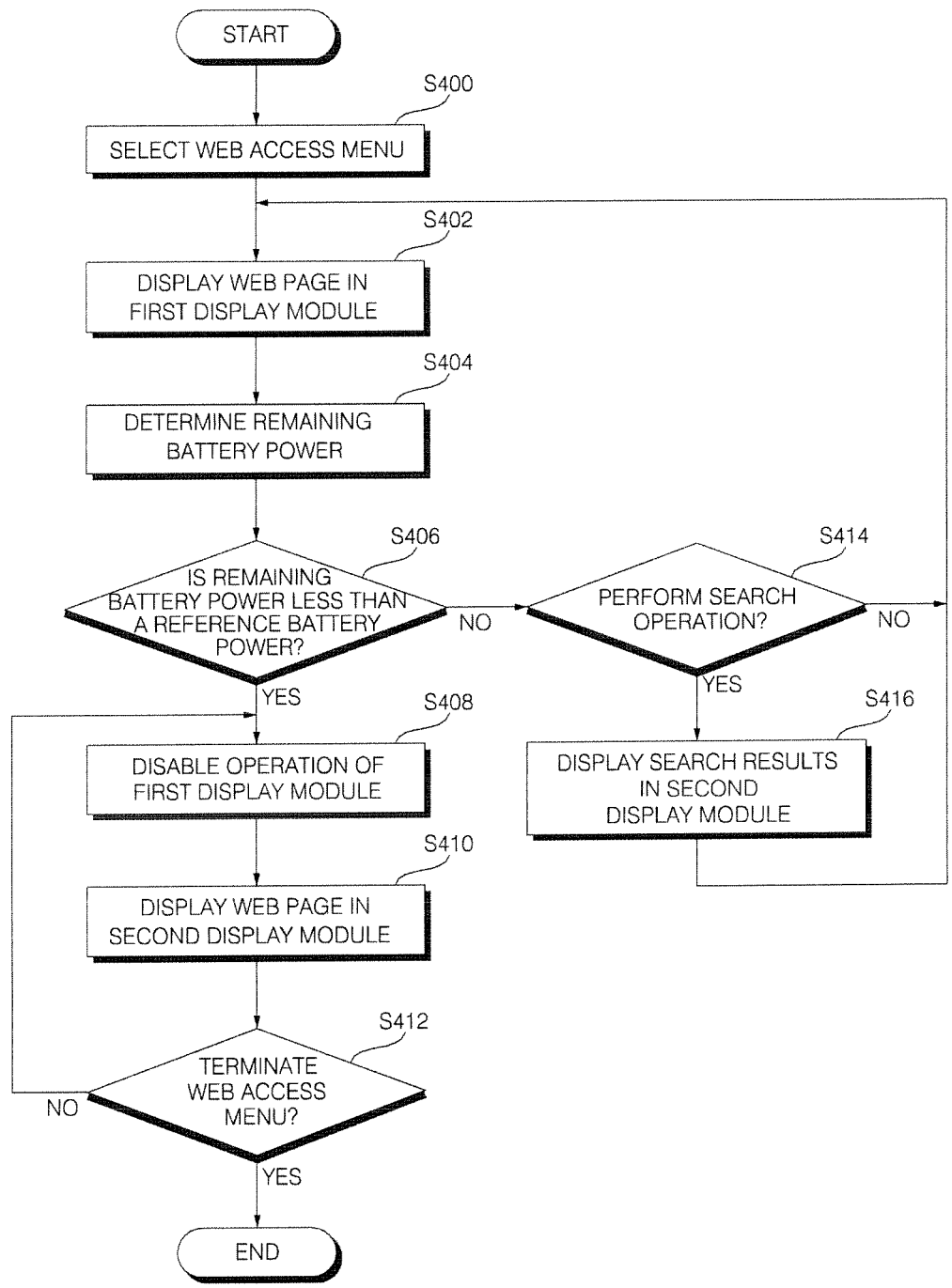
FIG. 4 illustrates a flowchart of a method of controlling a mobile terminal in accordance with one embodiment of the invention.

FIG. 4 illustrates a flowchart of a method of reducing power consumption in the mobile terminal 100 in accordance with one embodiment of the present invention.

Referring to FIG. 4, when a Web access menu is selected in response to a user command (S400), the controller 180 can initiate a Web browser and can control the wireless Internet module 115 to enable access to a Web page corresponding to a Web page address selected by a user. The controller 180 can control the first display module 151a to display the Web page (S402).

The controller 180 can determine the remaining battery power of the battery in the power supply unit 190 (S404) and can determine whether the remaining battery power is less than a reference battery power (S406).

In one embodiment, the power supply unit 190 can determine the remaining battery power of the battery by determining an amount of charge in the battery and can use the amount of charge to determine the remaining battery power. The power supply unit can transmit the determination to the controller 180.

If the remaining battery power is less than the reference battery power, the controller 180 can disable the operation of the first display module 151a (S408) and can control the second display module 151b to display the Web page (S410). Therefore, if the remaining battery power is less than the reference battery power, the controller 180 can operate the second display module 151b and can disable the first display module 151a to substantially reduce the power consumption of the mobile terminal 100. In one embodiment, a message indicating that the Web page is to be displayed by the second display module 151b or that the remaining battery power is insufficient to maintain operation of the first display module 151a can be displayed.

To further reduce the power consumption of the mobile terminal 100 and prevent delays in the reception of the Web page, the controller 180 can display only text data of the Web page. Moreover, in order to prevent unnecessary movement of the Web page, the controller 180 can display only necessary portions of the Web page.

The controller 180 can continuously display the Web page in the second display module 151b until the user desires to terminate the Web access menu (S412). In one embodiment, the controller 180 can automatically terminate the Web access menu after a predetermined amount of time has elapsed following the initiation of the Web access menu in order to allow the placing or receiving of a call or to perform other operations.

If the remaining battery power is greater than the reference battery power (S406), the controller 180 can display the Web page via the second display module 151b. If the user desires to perform a Web search operation (S414), the controller 180 can display the search result page in the second display module 151b (S416), instead of the first display module 151a, to display both the Web page and the search result page to the user. In other words, more than one Web page can be displayed at the same time using the first display module 151a and the second display module 151b.

Therefore, by selectively driving at least one of the first display module 151a and the second display module 151b according to the remaining battery power of the mobile terminal 100, the invention achieves a reduction in power consumption of the mobile terminal 100 during the performance of various functions, such as a Web access function.

Figure 5:
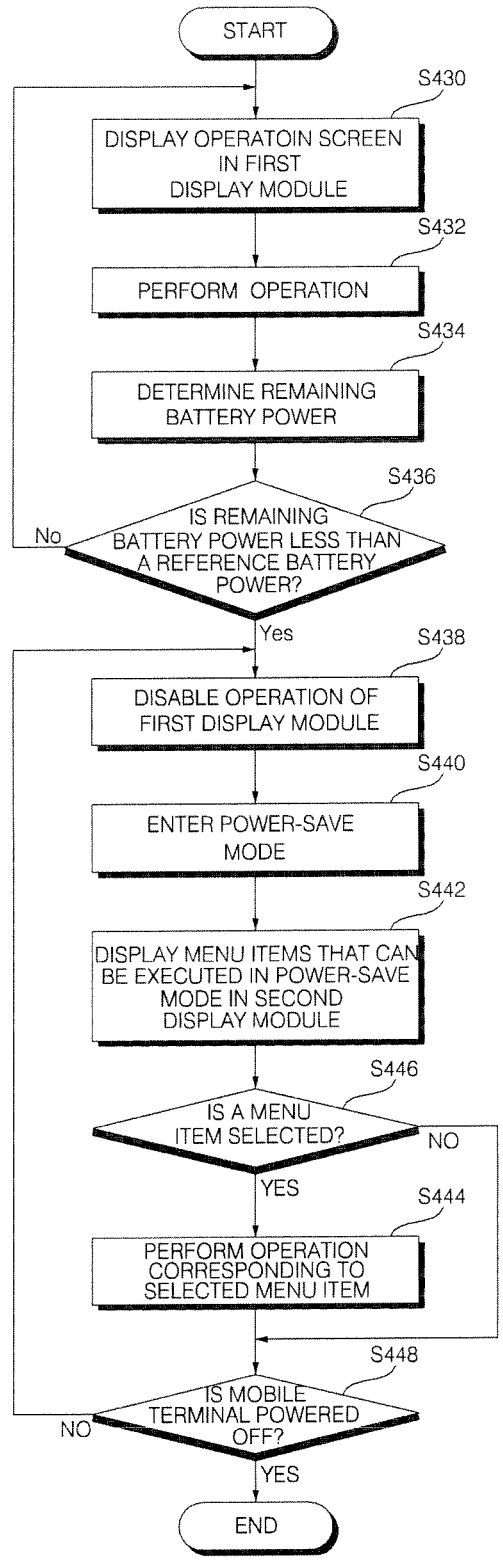
FIG. 5 illustrates a flowchart of a method of controlling a mobile terminal in accordance with one embodiment of the invention.

FIG. 5 illustrates a flowchart of a method of reducing power consumption in the mobile terminal 100 in accordance with one embodiment of the present invention.

As shown in FIG. 5, the controller 180 can control the first display module 151a to display an operation screen corresponding to an operation or menu of the mobile terminal 100 (S430). In one embodiment, the operation or menu can be chosen by the user. Thereafter, the controller 180 can perform the operation or menu (S432), determine the remaining battery power of the power supply unit 190 (S434), and determine whether the remaining battery power is less than a reference battery power (S436).

If the remaining battery power is less than the reference battery power, the controller 180 disables operation of the first display module 151a (S438) and thus turns off the first display module 151a. The controller 180 can then cause the mobile terminal 100 to enter a power-save mode (S440) and can control the second display module 151b to display a number of menu items that can be executed in the power-save mode (S442). In one embodiment, the controller 180 can display a message indicating that the remaining battery power is insufficient to maintain operation of the first display module 151a or that the second display module 151b is to be used instead of the first display module 151a.

For example, the menu items displayed by the second display module 151b in the power-save mode can be menu items that consume a relatively small amount of power or menu icons that must be immediately executed. As another example, menu items which consume a considerable amount of power, such as menu items for watching digital multimedia broadcasting (DMB) programs, playing moving image files or taking photos are preferably not displayed by the second display module 151b in the power-save mode. In one embodiment, the menu items displayed by the second display module 151b in the power-save mode are set by the user.

If a menu item displayed by the second display module 151b is selected (S446), the controller 180 can control an operation corresponding to the selected menu item (S444). In such a case, information indicating the period of time that the operation can be performed with the remaining battery power can be displayed in the second display module 151b. If the mobile terminal 100 is not powered off (S448), the method returns to operation S438. However, if the mobile terminal 100 is powered off (S448), the method ends.

If a menu item displayed by the second display module 151b is not selected (S446), the method proceeds to operation S448.

Therefore, the method in FIG. 5 allows various operation screens to be displayed by selectively using the first display module 151a or the second display module 151b according to the remaining battery power of the mobile terminal 100 to reduce power consumption in the mobile terminal 100.

Figure 6A:
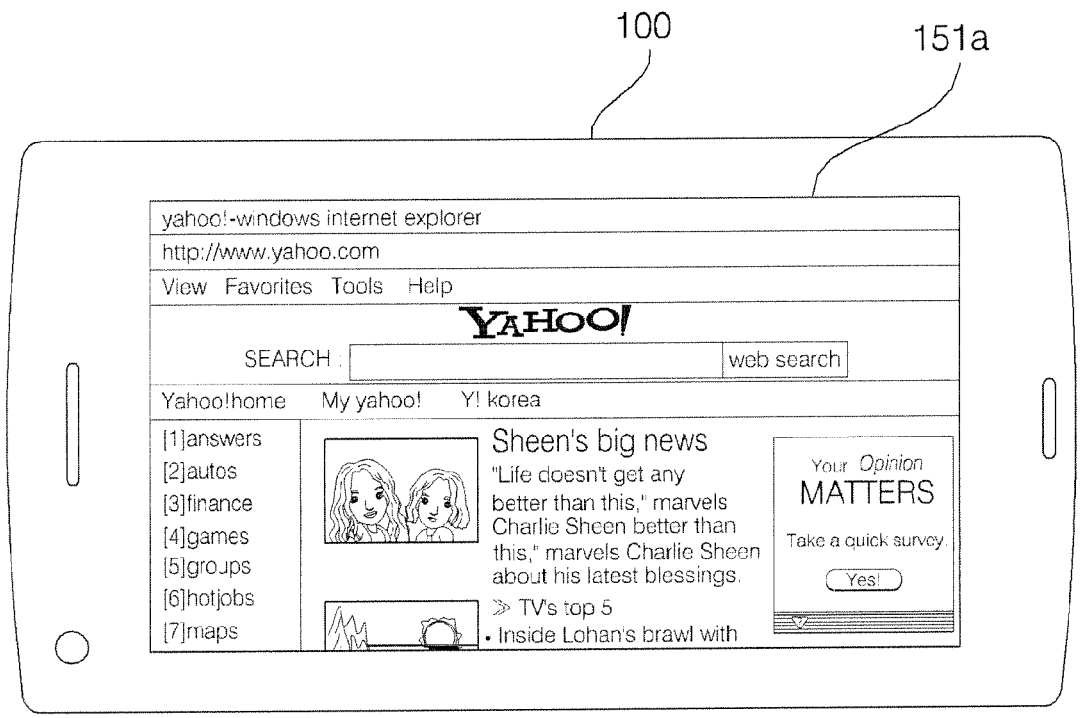
FIGS. 6A through 6C show exemplary screens displayed in a mobile terminal in accordance with one embodiment of the invention.
Figure 6B:
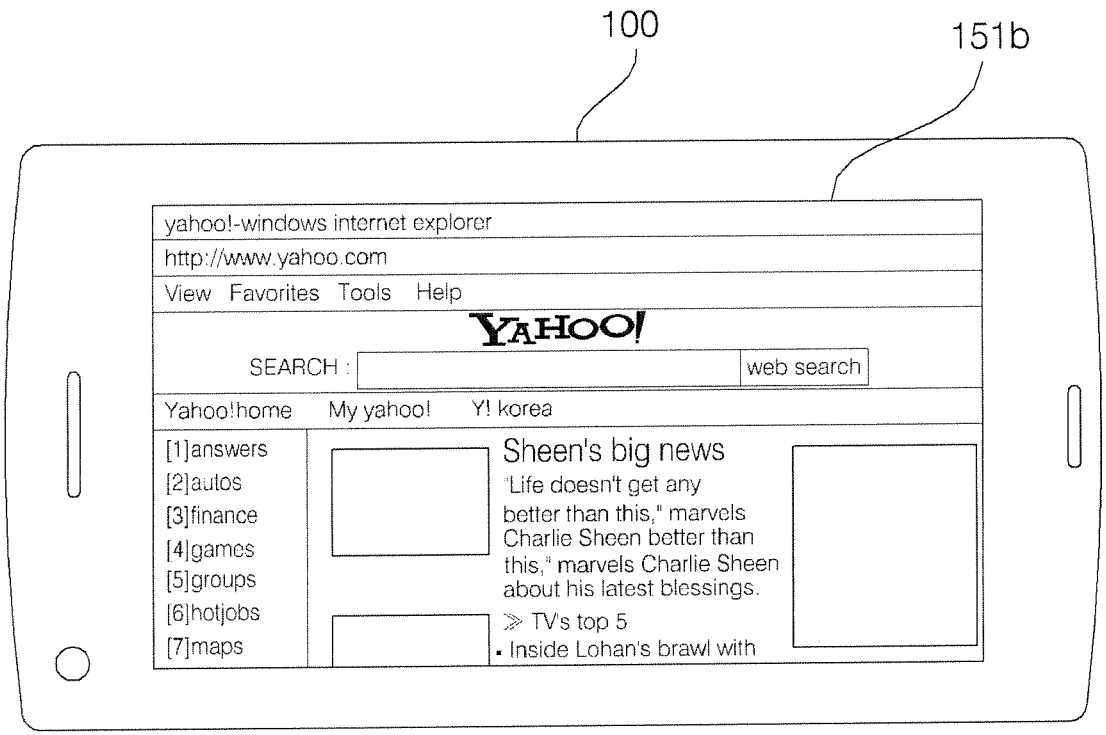
Figure 6C:
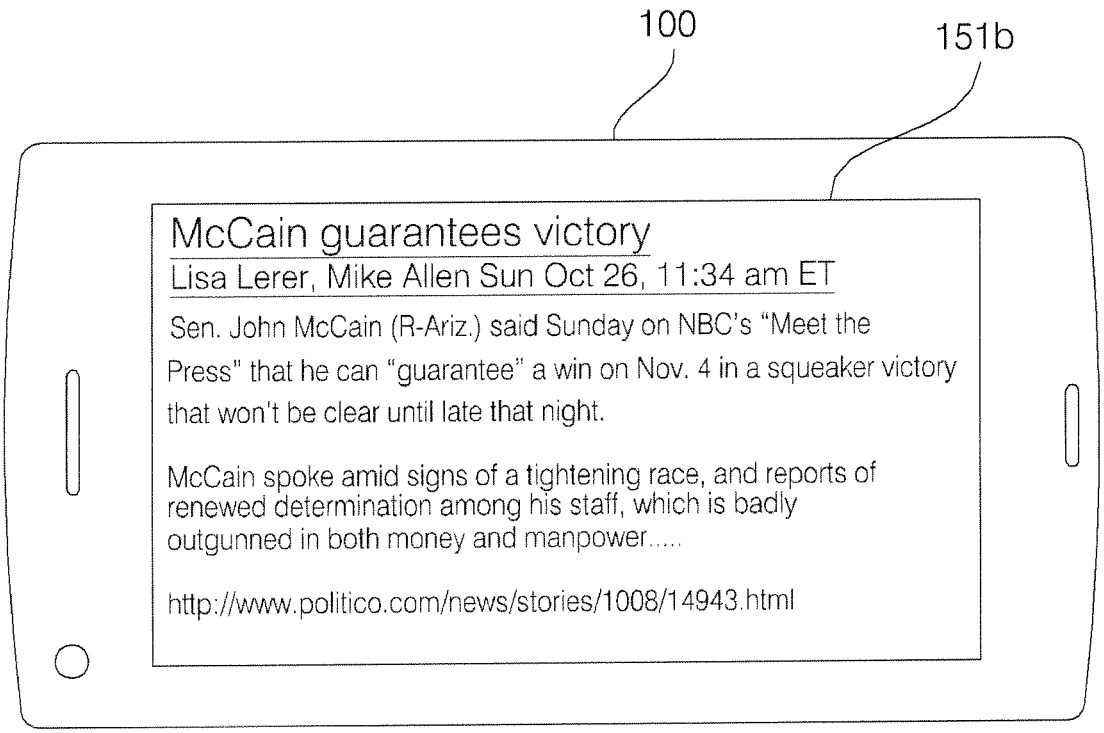

FIGS. 6A through 6C show exemplary screens displayed in the mobile terminal 100.

Referring to FIG. 6A, the first display module 151a can display a Web page in a color mode and can continue to display the Web page in a color mode if the battery power of the mobile terminal 100 remains greater than a reference battery power. On the other hand, if the remaining battery power of the mobile terminal 100 is less than the reference battery power, the operation of the first display module 151a can be disabled, and thus turned off.

As shown in FIG. 6B, the second display module 151b can display the same Web page shown in FIG. 6A in a text-only mode, which can also be referred to as a black-and-white mode. For example, the second display module 151b can display the Web page without displaying graphic images in order to prevent delays in the reception of the Web page and reduce the power consumption of the mobile terminal 100. As shown in FIG. 6C, for example, the second display module 151b can display only the text of the Web page.

Figure 7A:
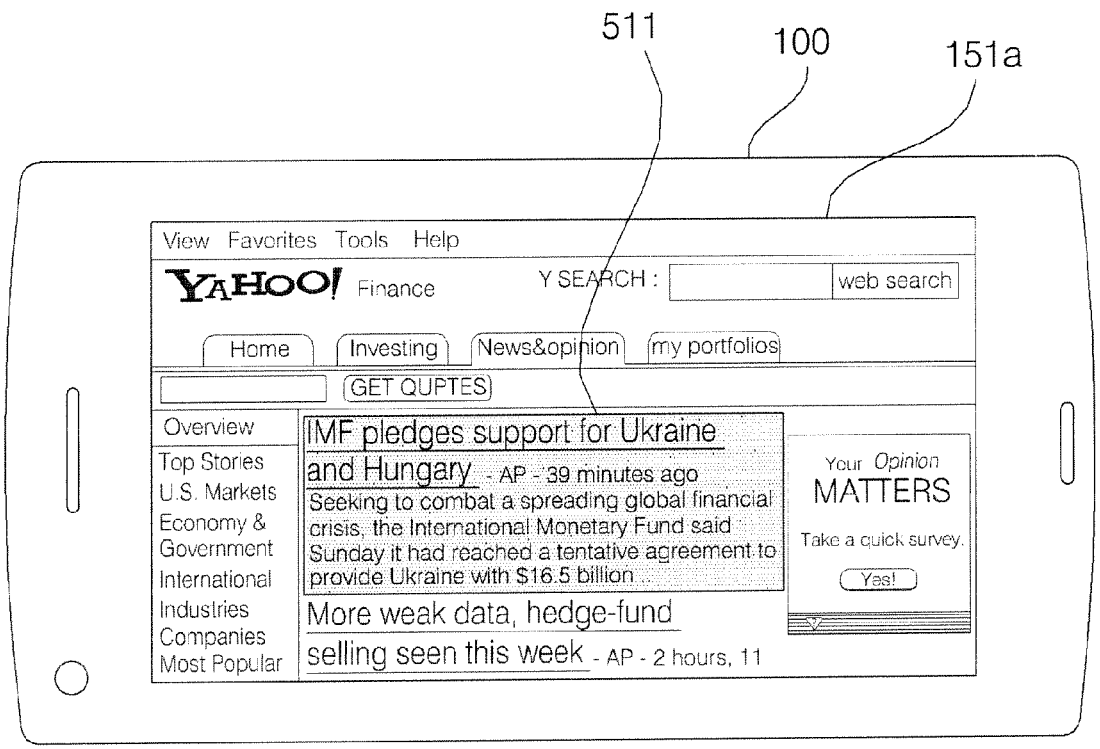
FIGS. 7A and 7B show exemplary screens displayed in the mobile terminal in accordance with one embodiment of the invention.
Figure 7B:
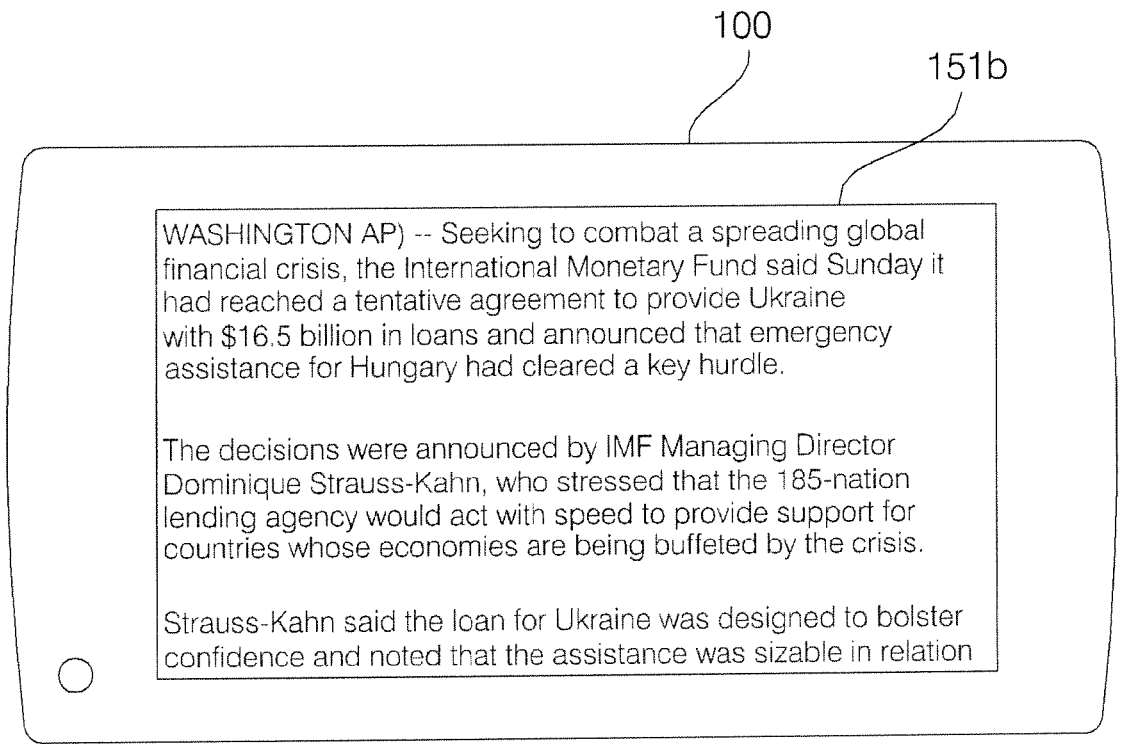

FIGS. 7A and 7B show exemplary screens displayed in the mobile terminal 100.

As shown in FIG. 7A, if a portion of a Web page displayed by the first display module 151a, such as the shaded portion 511, is selected by a user and the remaining battery power of the mobile terminal 100 is less than a reference battery power, the second display module 151b can display the shaded portion 511 of the Web page in the entirety of the second display module 151b, as shown in FIG. 7B, to prevent unnecessary movement or scrolling of the Web page.

Figure 8A:
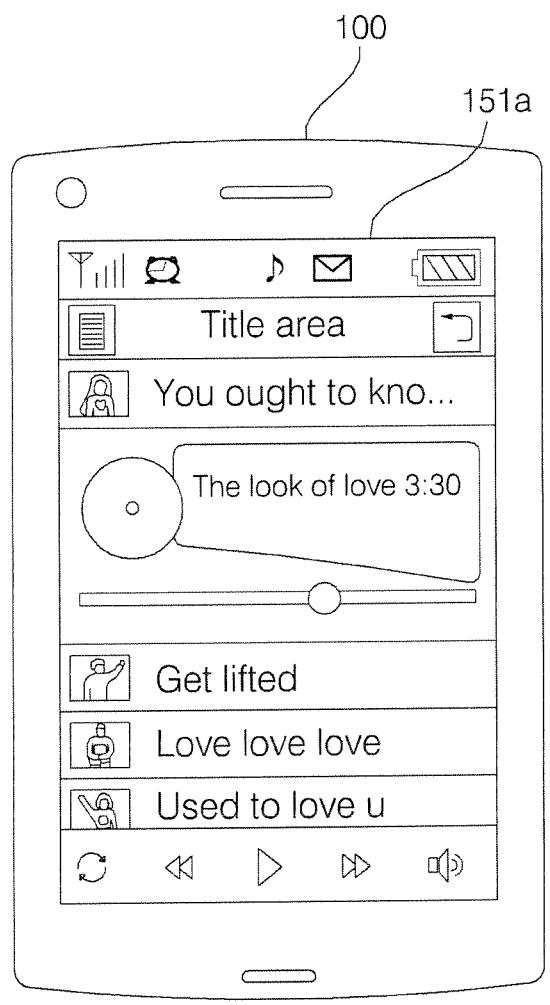
FIGS. 8A through 8C show exemplary screens displayed in the mobile terminal in accordance with one embodiment of the invention.
Figure 8B:
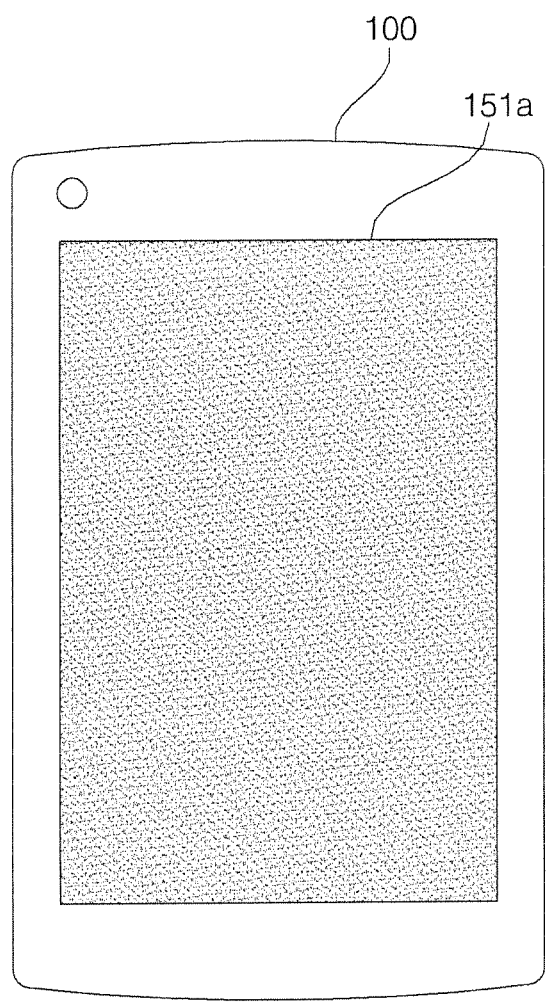
Figure 8C:
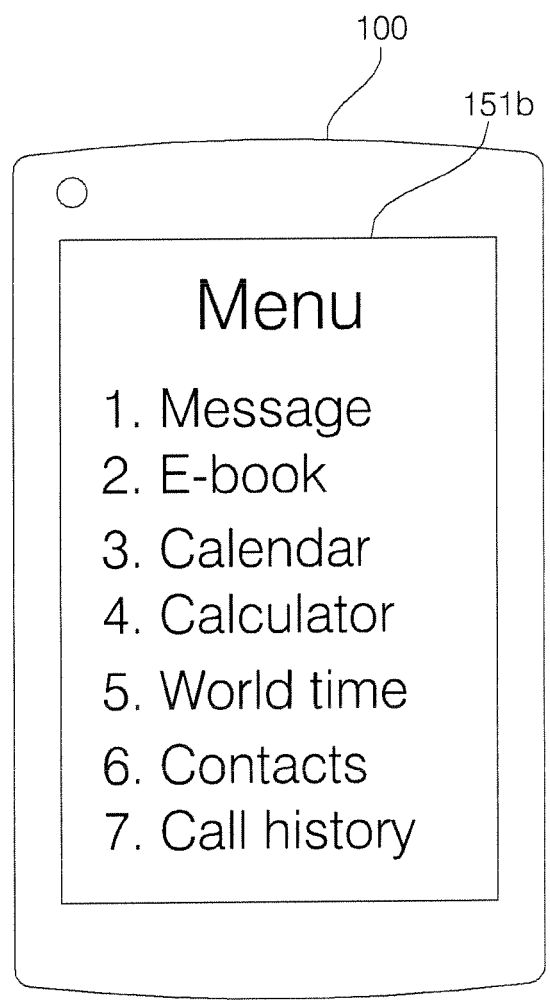

FIGS. 8A through 8C show exemplary screens displayed in the mobile terminal 100 in accordance with one embodiment of the invention.

As shown in FIG. 8A, if the remaining battery power of the mobile terminal 100 is less than a reference battery power when a multimedia play screen is displayed in the first display module 151a, the operation of the first display module 151a can be disabled and thus turned off as shown in FIG. 8B. Thereafter, the mobile terminal 100 can be placed in a power-save mode.

As shown in FIG. 8C, one or more menu items that can be executed in the power-save mode can be displayed by the second display module 151b.

For example, the menu items displayed by the second display module 151b in the power-save mode can be menu items corresponding to operations or functions that consume a relatively small amount of power, operations or functions that must be immediately executed, and operations or functions that are prioritized by the user. Information indicating the period of time that the operation or function can be performed in the power-save mode with the remaining battery power can also be displayed by the second display module 151b.

As described above, the present invention reduces power consumption of a mobile terminal having multiple display modules by selectively controlling the display modules according to a remaining battery power of the mobile terminal. Therefore, the present invention improves the power efficiency of a mobile terminal, while maintaining functionality and user convenience.

The mobile terminal according to the present invention and the method of controlling a mobile terminal according to the present invention are not restricted to the exemplary embodiments set forth herein. Therefore, variations and combinations of the exemplary embodiments set forth herein fall within the scope of the present invention.

The present invention can be implemented as code that can be executed by a processor included in the mobile terminal 100, such as a mobile station modem (MSM), and written on a computer-readable recording medium. The computer-readable recording medium can be any type of recording device in which data is stored in a computer-readable manner. Examples of the computer-readable recording medium include a read only memory (ROM), a random access memory (RAM), a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reducing power consumption in a mobile terminal having a first display module and a second display module, the method comprising:
displaying content of a first web page in a color mode in the first display module;
determining a remaining battery power of the mobile terminal;
disabling the first display module and displaying content of a second web page in a black-and-white mode in the second display module in response to determining that the remaining battery power is less than a reference battery power, wherein the displayed content of the second web page is the same as at least some of the displayed content of the first web page and comprises text included in the first web page without an image included in the first web page;
displaying a message in the second display module in response to determining that the remaining battery power is less than the reference battery power, wherein the displayed message comprises a first indication that the second display module is used instead of the first display module;
maintaining the display of the content of the first web page in the first display module and displaying a result screen in a black-and-white mode in the second display module in response to determining that the remaining battery power exceeds the reference battery power, wherein the result screen is obtained via a search performed via the displayed first web page; and
performing functions of a double-sided display using the first and second display modules,
wherein:
the first display module is disposed on a front side of a main body of the mobile terminal;
the second display module is disposed on a rear side of the main body; and
the first and second display modules form a symmetrical structure and face opposite directions from each other.

2. The method of claim 1, wherein the first and second display modules each include a touch screen and an e-paper.

3. The method of claim 1, wherein:
the front side faces frontwardly; and
the rear side faces rearwardly.

4. The method of claim 1, wherein displaying the content of the second web page comprises displaying a selected portion of the content included in the first web page.

5. The method of claim 1, further comprising setting the reference butte power according to a user input.

6. The method of claim 1, wherein the displayed message further comprises a second indication that the remaining battery power is insufficient.

7. The method of claim 1, further comprising entering a power-save mode by the mobile terminal when the first display module is disabled.

8. A mobile terminal comprising:
a main body;
a first display module located on a front surface of the main body and a second display module located on a rear surface of the main body; and
a controller configured to:
enable a display of content of a first web page in a color mode in the first display module;
determine a remaining battery power of the mobile terminal;
disable the first display module and display content of a second web page in a black-and-white mode in the second display module in response to determining that the remaining battery power is less than a reference battery power, wherein the displayed content of the second web page is the same as at least some of the displayed content of the first web page, and wherein the displayed content of the second web page comprises text included in first web page without an image included in the first web page;
enable display of a message in the second display module in response to determining that the remaining battery power is less than the reference battery power, wherein the displayed message comprises an indication that the second display module is used instead of the first display module;
maintain the enabled display of the content of the first web page in the first display module and display a result screen in a black-and-white mode in the second display module in response to determining that the remaining battery power exceeds the reference battery power, wherein the result screen is obtained via a search performed via the first web page; and
perform functions of a double-sided display using the first and second display modules,
wherein:
the first display module is disposed on the front surface of a main body of the mobile terminal;

the second display module is disposed on the rear surface of the main body; and the first and second display modules form a symmetrical structure and face opposite directions from each other.

9. The mobile terminal of claim 8, wherein the first and second display modules each include a touch screen and an e-paper.

10. The mobile terminal of claim 8, wherein the controller is further configured to cause the mobile terminal to enter a power-save mode after the first display module is disabled.

11. A method of reducing power consumption in a mobile terminal comprising a main body, the method comprising:

performing functions of a double-sided display using a first display module located on a front surface of the main body and a second display module located on a rear surface of the main body, wherein the first display module and the second display module form a symmetrical structure and face opposite directions from each other;

displaying an operation screen in a color mode in the first display module;

determining that a remaining battery power of the mobile terminal is less than reference battery power;

disabling the first display module and entering a power-save mode;

displaying one or more menu items that can be executed in the power-save mode, wherein the one or more menu items are displayed in a black-and-white mode in the second display module;

displaying content of a second web page in the second display module, the displayed content comprising text included in a first web page without an image included in the first web page; and displaying a message in the second display module in response to determining that the remaining battery power is less than the reference battery power, wherein the displayed message comprises an indication that the second display module is being used instead of the first display module.

12. The method of claim 11, wherein the first and second display modules each include a touch screen and an e-paper.

13. The method of claim 11, further comprising performing an operation corresponding to the displayed one or more menu items in response to an input received at the mobile terminal.

14. The method of claim 13, further comprising displaying information in the second display module to indicate a period of time during which the operation can be performed according to the determined remaining battery power.

15. A mobile terminal comprising:

a main body;

a first display module located on a front surface of the main body and a second display module located on a rear surface of the main body; and a controller configured to:

perform functions of a double-sided display using the first and second display modules, wherein the first and second display modules form a symmetrical structure and face opposite directions from each other;

enable display of an operation screen in a color mode in the first display module;

determine that a remaining battery power of the mobile terminal is less than a reference battery power;

disable the first display module, cause the mobile terminal to enter a power-save mode, and enable display of one or more menu items that can be executed in the power-save mode, the one or more items displayed in a black-and-white mode in the second display module;

enable display of content of a second web page in the second display module, the displayed content comprising text included in the first web page without displaying an image included in the first web page;

enable display of a message in the second display module in response to determining that the remaining battery power is less than the reference battery power, wherein the displayed message comprises an indication that the second display module is being used instead of the first display module.

16. The mobile terminal of claim 15, wherein the first and second display modules each include a touch screen and an e-paper.

17. The mobile terminal of claim 15, wherein the controller is further configured to control an operation corresponding to the displayed one or more menu items in response to an input received by the mobile terminal.

* * * * *